United States Patent [19]

Johansson

[11] 4,115,152

[45] Sep. 19, 1978

[54] METHOD AND DEVICE FOR GAS PLANING A WORKPIECE SURFACE TO REMOVE SURFACE DEFECTS

[75] Inventor: Bengt Johansson, Göteborg, Sweden

[73] Assignee: Centro-Maskin Göteborg AB, Göteborg, Sweden

[21] Appl. No.: 815,272

[22] Filed: Jul. 13, 1977

[30] Foreign Application Priority Data

Jul. 19, 1976 [SE] Sweden ............................. 7608208

[51] Int. Cl.² ........................... B23K 7/00; B23K 7/06
[52] U.S. Cl. ....................................... 148/9.5; 266/49; 266/51
[58] Field of Search ...................... 148/9.5; 266/51, 49

[56] References Cited

U.S. PATENT DOCUMENTS

| | | | |
|---|---|---|---|
| 2,157,095 | 5/1939 | Bucknam | 148/9.5 |
| 2,365,308 | 12/1944 | Sylvester | 148/9.5 |

*Primary Examiner*—W. Stallard
*Attorney, Agent, or Firm*—Thompson, Birch, Gauthier & Samuels

[57] ABSTRACT

A method and a device for gas planing with at least one gas planing device, at which the gas flowing out of the device is shielded off in lateral direction, and gas streams are directed substantially perpendicular from both sides to the gas flowing out of the planing device for applying a retaining effect on the melt being formed, and simultaneously gas streams are directed to the forward portion of the melt for applying a lifting and removing effect thereon.

5 Claims, 2 Drawing Figures

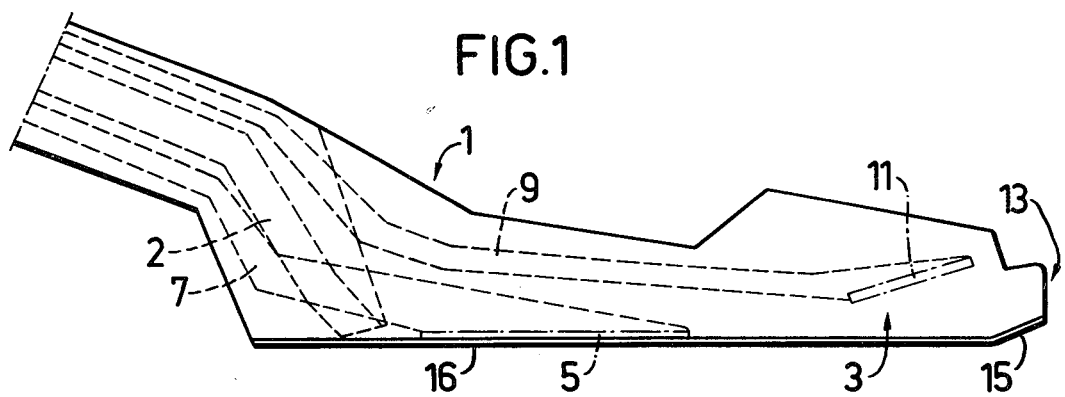
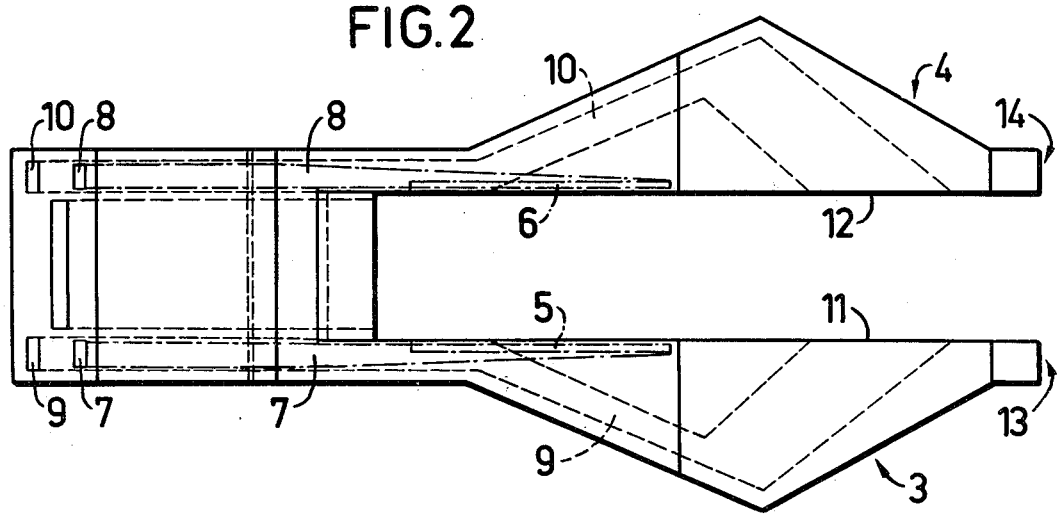

METHOD AND DEVICE FOR GAS PLANING A WORKPIECE SURFACE TO REMOVE SURFACE DEFECTS

This invention relates to a method of gas planing and to a device for carrying out the method.

During gas planing, oxygen gas often is used as the oxidizing medium. The workpiece, the surface of which is to be treated, substantially consists of an iron alloy and, therefore, the planing operation after an initiating ignition can continue while oxygen gas is being supplied. The ignition can be effected in the way described in U.S. Pat. No. 3,658,599 or in another known manner. The melt forming during the planing operation can give rise to problems when it is permitted to flow out laterally relative to the working direction. The risk then is great that the melt solidifies on the workpiece surface and can be removed only by grinding or the like. The melt also has the object of pre-heating that portion of the workpiece surface which is located in the feed direction immediately ahead of the gas planing device. It is also for this reason desirable to control the melt spread in lateral direction.

The present invention has the object of rendering possible a method of gas planing and producing a device for carrying out the method, by which method the handling of the melt being formed during the planing operation is facilitated and the melt can efficiently be removed.

The shielding of the main gas flow in the lateral direction facilitates the handling of the melt being formed in front of the main nozzle.

On each side of the mouthpiece of the main nozzle shielding side portions are provided, between which the forming melt is retained. The gaps opening in the side portions increase the effect of laterally retaining the melt by gas outflow from the gaps.

The mouthpiece openings provided at the forward end of the side portions and directed toward each other have the object of guiding air streams, which lead the forward melt portion being pushed ahead by the main flow away from the workpiece surface.

The design of the lower surface of the side portions and rear portion of the planing device in the form of a slide shoe renders it possible to start the gas planing by a flying start even at the edge zone of the workpiece. In such a case the workpiece is fed toward the planing device. When the forward portions of the side portions, which preferably are slightly upward angular, meet the workpiece edge, the operation can commence immediately. The time elapsing until the main nozzle mouth of the planing device meets the edge portion of the workpiece is sufficiently long for preheating said portion and permitting an immediate oxidizing melting working when the main nozzle is passing.

The invention is described in the following, with reference to an embodiment where the invention according to the invention is applied, and which is shown in the accompanying drawings, in which FIG. 1 is a lateral view of a planing device intended for a turbulent gas flow, and FIG. 2 is a view from above of the device according to FIG. 1.

The planing device 1 preferably is hingedly supported and adjustable in height. It comprises passageways 2, 7, 8, 9, 10 for the supply of both the oxidizing gas, the gas stream for holding together the melt in lateral direction, and the gas stream for guiding the melt.

The side portion 3, 4 of the planing device 1 confine the gas flow in lateral direction and, together with the gas stream from the gaps 5, 6, prevent lateral spread of the melt. At the forward end portions 13, 14 of the side portions 3, 4 the passageways 9, 10 open into evacuation nozzles 11, 12, which are directed forward downward with a turn relative to the horizontal plane. The gas streams from the nozzles 11, 12 guide the melt away from the workpiece surface and remove the melt, for example by means of an evacuation device (not shown).

The forward end portions 13, 14 of the side portions 3, 4 are upward angular, so that the slide shoe 16 formed by the lower surfaces of the side portions and rear portion of the planing device can be moved in the direction toward a workpiece and softly be brought into engagement with the edge portion of the workpiece, whereby when required the planing device can be initiated.

The embodiment shown comprises only one planing device. It is possible, however, to position several devices to the side of each other, possibly offset in the longitudinal direction, so that the entire surface of the workpiece can be worked during one feed operation.

The planing device is especially suitable for spot planing a workpiece surface and renders possible a particularly efficient and troublefree working operation.

What I claim is:

1. A method of gas planing with at least one planing device, wherein the gas flowing out of the device is confined laterally in relation to the working direction, characterized in that gas streams are directed substantially perpendicularly onto the workpiece from both sides of the gas flowing out of the planing device for applying a lateral retaining effect on the melt being formed, and gas streams simultaneously are directed to the forward portion of the melt for applying a lifting and removing effect thereon.

2. A device for gas planing with at least one planing device having a central nozzle for directing gas downwardly at an angle onto a workpiece, characterized in that the planing device is provided with side portions extending forwardly from opposite sides of the central nozzle, the lower edges of said side portions having gas gaps arranged to direct gas streams substantially perpendicularly onto the workpiece, and the forward end portions of said side portions are provided with nozzle mouths directed substantially obliquely to each other.

3. A device according to claim 2, characterized in that the nozzle mouths are of long and narrow shape and directed downward-forward and turned in relation to the horizontal plane.

4. A device according to claim 2, characterized in that the lower surfaces of the side portions and rear portion of the planing device constitute a slide shoe.

5. A device according to claim 4, characterized in that the forward lower edges of the side portions are upward angular to form a stop surface.

* * * * *